Patented Aug. 14, 1928.

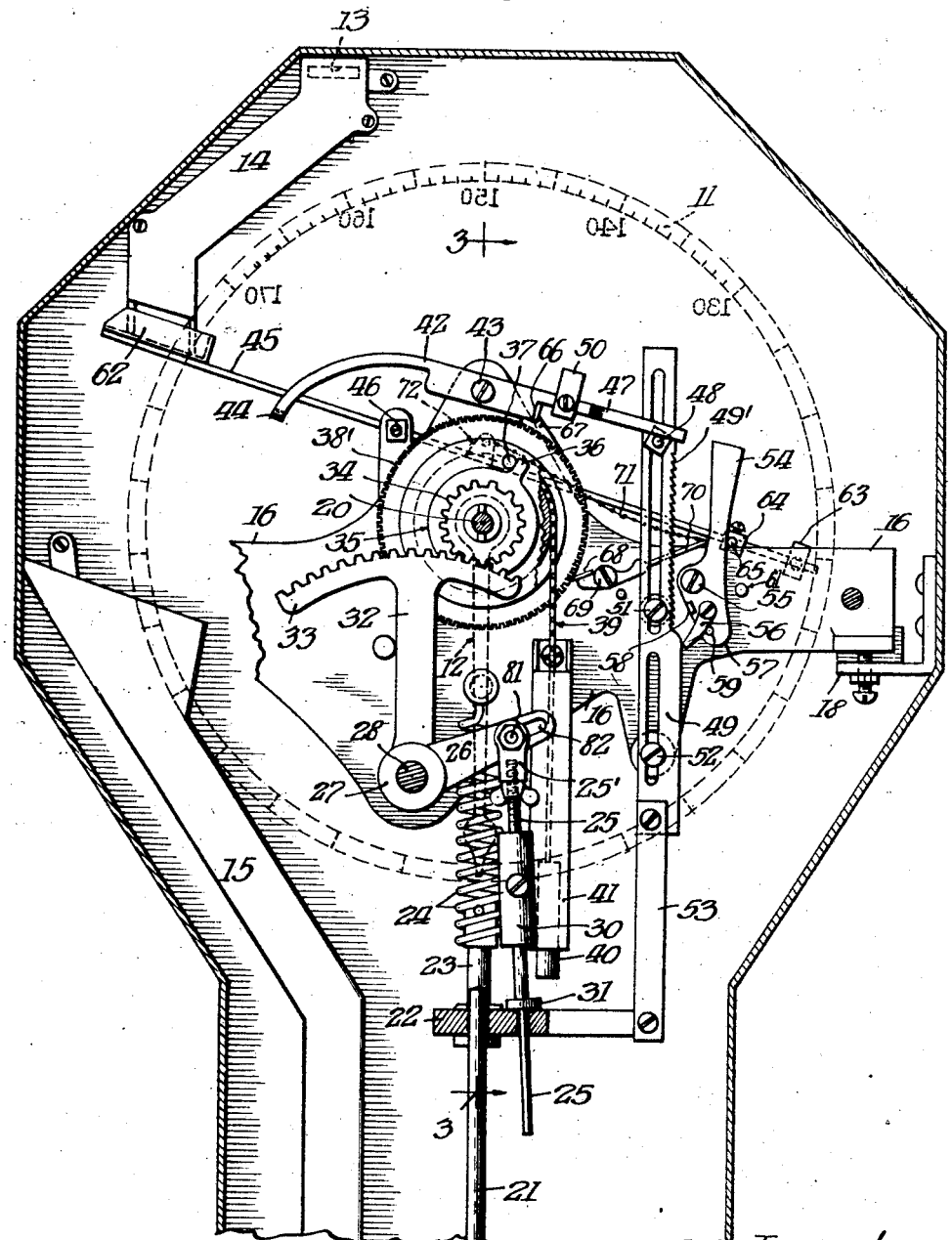

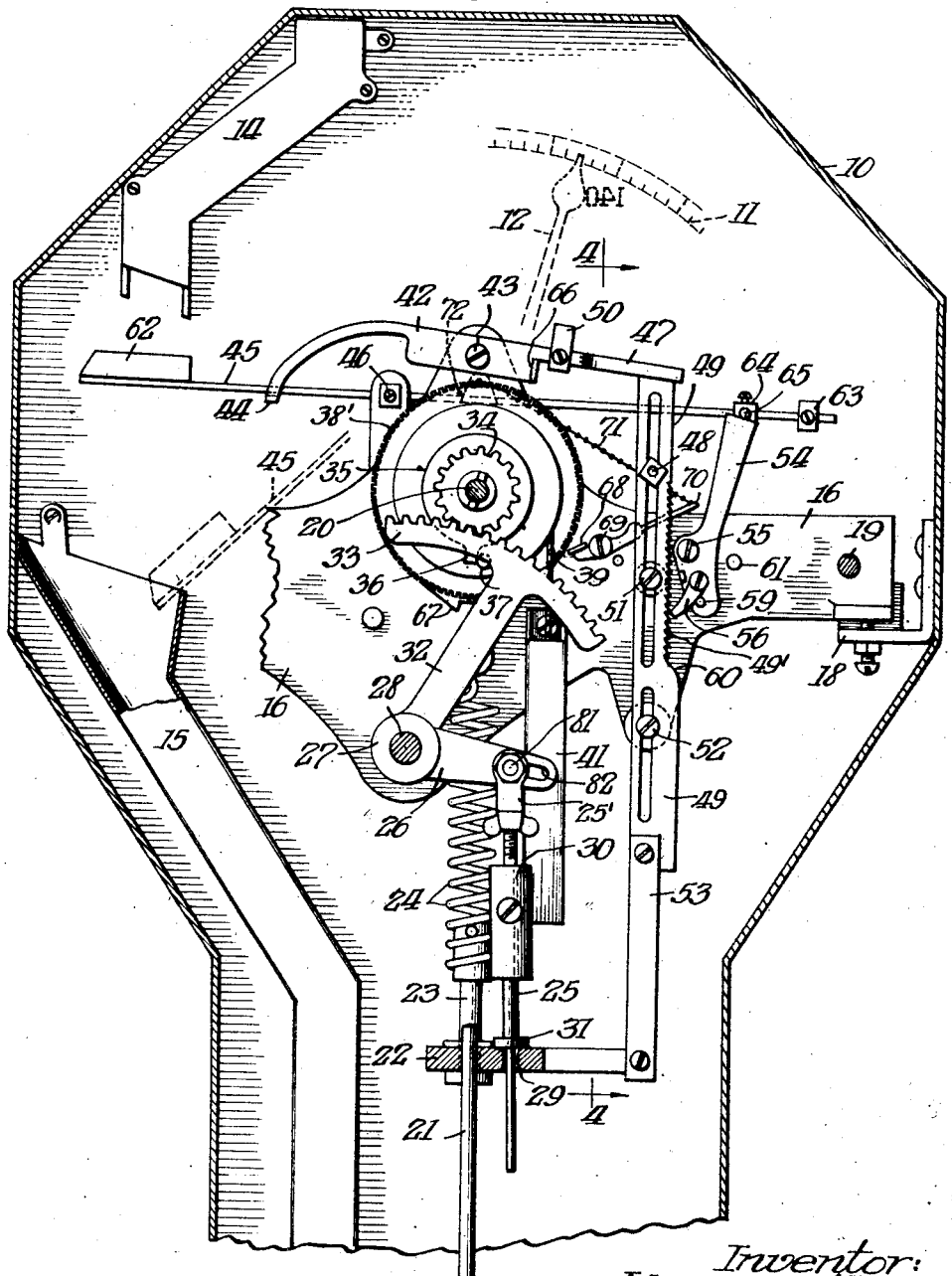

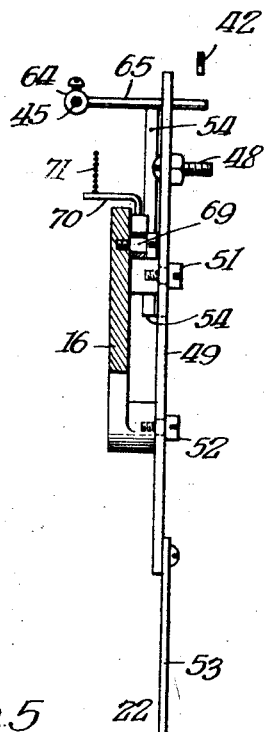
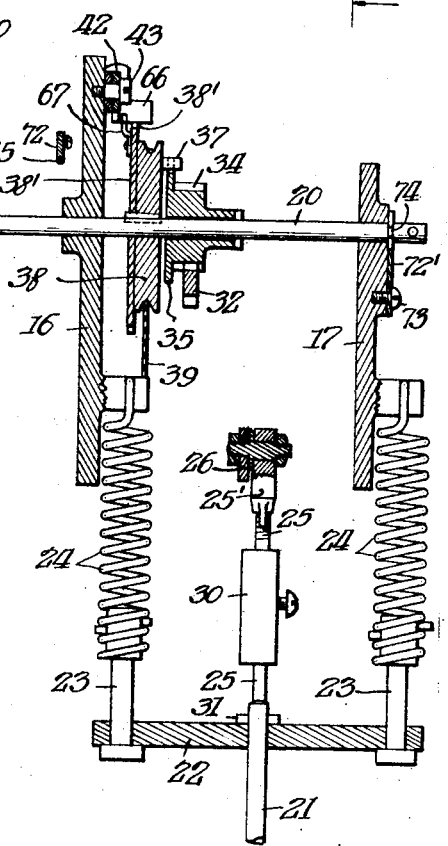
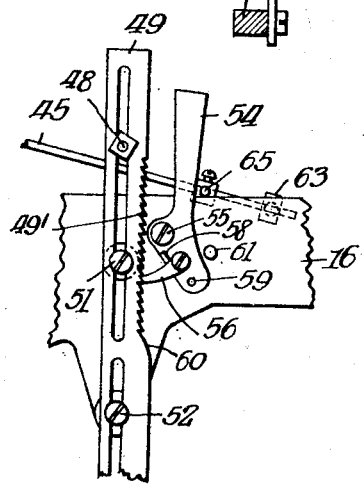
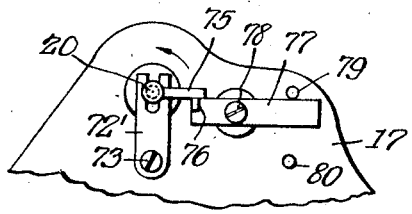

1,680,579

UNITED STATES PATENT OFFICE.

JOHN B. WATLING, OF CHICAGO, ILLINOIS.

WEIGHING MECHANISM.

Application filed August 4, 1923. Serial No. 655,574.

This invention relates to weighing scales but more particularly to the coin-controlled type and has for its principal objects to provide a dependable mechanism which will effectually prevent the weighing of more than one person for a single coin; to arrange the indicating mechanism so that it plainly shows that the machine is not weighing when an attempt is made to secure an extra weighing without depositing another coin; and to eliminate any possibility of injury or damage to the weighing mechanism through rough usage and abuse in attempting to secure free weighing.

Scales of this type are generally located in public places without protection and are subject to considerable abuse particularly through attempts to cheat the machine by securing the weights of several persons without depositing additional coins. In some machines of this character, adequate safeguards against such unauthorized use are not provided and it is possible to obtain the weights of several persons for one coin by merely maintaining some weight upon the platform between weighing operations. This, of course, results in loss of revenue to the proprietor of the machine. In other machines a checking or retarding device is arranged to act upon the weight indicating mechanism so that it does not operate freely when another weighing is attempted without depositing another coin, but such devices show a change in weight, which, although inaccurate, may sometime be taken as accurate or as indicating that the scale does not weigh correctly, and thus result in loss of revenue.

With my invention, any attempt to obtain an extra weighing without depositing another coin results in a setting of the mechanism substantially at the weight which has been properly obtained, and the mechanism remains in this condition until all weight is removed, when the mechanism returns to normal or zero position. Thus it is not only impossible to cheat the machine and obtain another weighing but moreover, as no substantial change occurs in the weight just obtained, it will be apparent to the operator that it is necessary to insert another coin to obtain another weighing.

The many other objects and advantages of my improved weighing scale will be better appreciated by reference to the following specification when considered in connection with the accompanying drawings illustrating a selected embodiment thereof, in which:—

Fig. 1 is a vertical section on the line 1—1 of Fig. 3 showing in rear elevation the weighing mechanism and safety device forming the present invention, the parts being in their normal or zero position.

Fig. 2 is the same as Fig. 1 but with the parts in weighing position.

Fig. 3 is a vertical section on the line 3—3 of Fig. 1.

Fig. 4 is a vertical section on the line 4—4 of Fig. 2.

Fig. 5 is a detail rear elevation of a portion of the mechanism illustrating the operation of the safety mechanism, and Fig. 6 is a detail rear elevation of a portion of the weighing mechanism.

Referring to the drawings, my improved weighing scale comprises the usual casing 10, dial 11, indicating pointer 12 and weighing platform (not shown). A coin slot 13 communicates with a coin chute composed of spaced upper and lower sections 14 and 15 respectively. Parallel frame members 16 and 17 have their ends supported by adjustable brackets 18 on the opposite side walls of the casing 10. These members, which are secured together by bolts 19 adjacent their ends, from the supports for the weighing mechanism. The pointer 12 is mounted on the revoluble shaft 20 supported by the frame members 16 and 17.

A rod 21 has its lower extremity connected to the weighing platform in the usual manner. The upper extremity of this rod is supported by a yoke 22 which is connected by bolts 23 to the lower extremities of the weighing springs 24. One of these springs 24 is suspended from the frame member 16 and the other from the member 17. A rod 25 is pivotally connected at its upper end by an adjustable turnbuckle 25' to a pin 81 which is adjustable along and adapted to be locked at any desired point in the slot 82 of the arm 26 of the bell crank 27 which latter is supported by a stud shaft 28 projecting rearwardly from the frame member 16. The lower portion of this rod projects loosely through an aperture 29 in the yoke 22 and is formed with a shoulder 31 to engage the upper face of the yoke and limit the downward movement of the rod in the aperture 29. A weight 30 is secured upon the rod 25 above the yoke. A segmental gear 33 is formed on the outer end of the arm 32 of the bell crank 27. This gear meshes with a pinion 34 free upon the shaft 20. A flange 35 is formed on the periphery of this gear at its front end and a lug 36 projects radially from this flange to engage a pin 37 in the rear face of the pulley 38 which latter is keyed upon the shaft 20. A toothed disk 38' is secured to the front face of this pulley 38. The pulley 38 is provided with a peripheral groove to receive a chain 39. The inner end of this chain is secured to the pulley and a weight 40 is suspended at the outer end thereof in a tubular guide 41 which is attached at its upper end to the frame 16.

A locking lever 42 is pivotally mounted at 43 on the frame member 16. One extremity 44 of this lever is turned forwardly beneath the trip lever 45 pivoted on the frame member 16 at 46. The opposite extremity 47 of the lever 42 normally rests on the adjustable pin 48 carried by the upper portion of a vertically slidable plate 49. A weight 50 is adapted to normally depress the extremity 47 of the lever 42 and retain it upon the pin 48. The plate 49 is supported and guided by screws 51 and 52 seated in the frame member 16 and passing through longitudinal slots in the plate. The lower end of the plate 49 is connected to the yoke 22 by a link 53 so that vertical movement of this yoke causes a corresponding movement of the plate. A rock arm 54 is pivotally connected at 55 to the frame member 16 and a dog 56 is pivoted on an extension 57 of this arm between stops 58 and 59. The pivotal connection of this arm 54 is located at one side of the center of gravity so that the upper portion of the arm normally tends to swing away from the plate 49, causing the dog 56 to press against the edge of this plate. The edge of the plate 49 contacting with this dog has its upper portion 49' cut away and serrated. The edge portion 60 between the upper and lower parts of the plate forms a cam face to force the dog 56 outwardly and the upper portion of the arm 54 inwardly as the plate moves upwardly in the manner which will be described more fully hereinafter. A stop 61 is provided to limit the movement of the arm 54.

The trip lever 45 is provided at one end with a coin holder or pocket 62 which normally fits over the lower end of the upper portion 14 of the coin chute. A coin descending in this portion of the chute lodges temporarily in this pocket and depresses the pocketed end of the trip lever into the position indicated in dotted lines in Fig. 2 where the coin is emptied into the lower portion 15 of the chute. A weight 63 on the opposite end of the lever 45 causes the pocket end to be raised as soon as the coin is discharged. An adjustable stop 64 is mounted on the lever 45 near its weighted end and has a pin 65 projecting rearwardly therefrom beyond the arm 54. The downward movement of the pocketed end of the lever 45 depresses the end 44 of the locking lever 42, lifting the locking dog 66 on this lever 42 out of engagement with the stop 67 at the periphery of the toothed disk 38'. A locking dog 68 is pivotally connected to the frame 16 at 69 and an operating arm 70 on the extension of this dog is connected by a chain 71 with a lug 72 on the trip lever 45. This dog is normally in engagement with the toothed periphery of the disk 38' and is moved out of engagement therewith by depression of the pocketed end of the lever 45. The stop 67 is offset somewhat at the front of the disk 38' so that it clears the dog 68.

The shaft 20 is held against axial displacement in the bearings of the frame members 16 and 17 by a plate 72' which is secured to the frame member 17 by the screw 73 and has a slot at the upper end engaging in an annular groove 74 at the rear end of the shaft 20. For the purpose of checking the return movement of the shaft 20 and holding the indicator 12 at zero position, a pin 75 projects radially from the rear end of the shaft 20 and engages with an outturned projection 76 on the inner end of the lever 77 which is pivoted at 78 to the rear frame member 17. The outer end of this lever 77 is confined between the upper and lower pins 79 and 80 respectively which allow sufficient movement of the lever 77 so that the shaft 20 may make a complete revolution.

In the operation of the mechanism, the person desiring to be weighed steps upon the weighing platform before depositing a coin. This causes the platform, the yoke 22 and the plate 49 to be depressed and the springs 24 to be extended a distance depending on the weight of the person. The indicating mechanism remains locked and inoperative until the coin is inserted. The insertion of the coin causes the trip 45 to disengage the dog 66 from the stop 67 and the dog 68 from the teeth of the disk 38'. The weight 30 now causes the segmental gear 33 to rotate the pinion 34 in a counter-clockwise direction, viewing the mechanism from the rear. The downward movement of this weight is halted by the stop shoulder 31 coming in contact with the yoke 22 so that the extent of this movement depends on the weight of the person. The rotation of the pinion 34 causes a corresponding rotation of the pulley 38, the toothed disk 38' and the pointer 12, due to the engagement of the lug 36 with the pin 37. Assuming the yoke 22 to have been depressed as shown in Fig. 2, the indicating parts will come to rest in the position there shown. A greater depression of the yoke will cause a correspondingly greater rotation of the pointer. The scales may be adjusted to provide an accurate reading of the pointer by placing a known weight on the platform and adjusting the rod 25 in the turnbuckle 25' so that with the shoulder 31 resting on the yoke, the pointer will indicate the correct weight on the dial. The weight 40 is lighter than the weight 30 so that the chain 39 is wound upon the pulley 38 and the weight 40 lifted by the downward movement of the weight 30.

The depression of the yoke 22 in the manner described correspondingly draws down the plate 49 and brings the dog 56 into engagement with the cut-away portion of this plate, permitting the upper portion of the arm 54 to swing outwardly into the position indicated in Fig. 2 and bringing the upper end of this arm into the path of the pin 65 on the trip lever 45. As soon as the coin has been discharged from the pocket 62, the weight 63 causes the lever 45 to swing upon its pivot but this movement is interrupted by the pin 65 coming in contact with the upper end of the arm 54 and the dogs 66 and 68 are thus held out of engagement with the toothed disk 38'. The pointer will now remain at the proper point on the dial as long as the person stays upon the weighing platform. When the person steps off the platform, the plate 49 is lifted by the yoke and the dog 56 is thrown upwardly by its engagement with the teeth 49' thereby forcing the lower end of the arm 54 outwardly and the upper portion of the arm 54 to swing inwardly, thereby releasing the pin 65 and permitting the trip lever to return to its normal position. The return of the trip lever releases the locking lever 42 and permits the dog 68 to move into engagement with the teeth of the disk 38'. The pin 48 holds the dog 66 out of engagement with the teeth of the disk so that the indicating mechanism may now return to normal or zero position, but locates this dog in the path of the stop 67 which lifts the dog 66 as it moves thereby and interlocks therewith to hold the indicating mechanism against movement until another coin is inserted. The return movement of the segmental gear 33 and the pinion 34 is produced by the upward movement of the yoke 22 under the action of the springs 24. The weight 40 returns the disk 38' and pointer 12.

Assume now that the parts are in the position shown in Fig. 2 with the weight of the coin depositor indicated.

If an attempt is made to obtain the weight of another person by changing places on the platform, it is practically impossible to maintain a uniform pressure on the weighing platform and an oscillation or reciprocation of the plate or ratchet bar 49 to some extent invariably occurs, either as the second person steps on the platform, or as the first person steps off. As the dog or pawl 56 is at such time engaged with the serrated portion 49' of said plate, the arm or dog 54 is rocked and the pin 65 released. This releases the dogs 66 and 68 and permits them to move into engagement with the teeth of the ratchet disk 38' and the disk and the indicating mechanism is thereby held against movement in both directions so that no further indication of weight is possible until all weight has been removed from the platform and the pin 48 in the plate 49 returns the dogs 66 and 68 to their normal positions. The locking of the indicating mechanism against movement in both directions shows plainly that the machine is not indicating the weight of the second person.

It is readily evident that a safety mechanism has been provided which absolutely prevents the weighing of more than one person for a single coin. This mechanism is simple in construction and in no way interferes with the legitimate use of the weighing scale.

I am aware that numerous changes may be made in the construction, arrangement, and mode of operation of the various parts without departing from the spirit of my invention and I reserve the right to make all such as fairly fall within the scope of the following claims.

I claim as my invention:

1. A coin-controlled weighing scale comprising weighing mechanism having a platform, indicating mechanism having the extent of its initial movement determined by the position of said weighing mechanism, coin-controlled means for locking said mechanism, means for holding said coin controlled locking means in released position and actuated by the movement of said weighing mechanism when the weight has been removed from the scale or reduced subsequent to the completion of the initial movement of said indicating means for permitting said coin-controlled locking means to lock said indicating means against further movement in either direction, said weighing mechanism including a part adapted to be shifted with a sliding movement to release said coin-controlled locking means at the termination of the weighing operation.

2. In a weighing scale, the combination of a weight actuated member, a dial, a rotatable indicator cooperating with said member, locking means for said indicator, means to release said locking means to permit movement of said indicator during the weighing operation and operable upon relaxation of the weight on said member to permit said locking means to lock the indicator substantially in the position of indication of the determined weight, and a part movable with the weight actuated member and serving to release said locking means from the indicator upon return of the weight actuated member to the normal position.

3. In a weighing scale, the combination of a weight actuated member, a rotary member cooperating therewith and provided with an indicator for indicating the weight on said member, a plurality of latches normally engaging said rotary member, means for disengaging said latches during the weighing operation and adapted to permit said latches to interlock therewith upon relaxation of weight on the weight actuated member or vibration thereof so as to hold the indicator substantially in the determined weight indicating position, and a plate slidable with the weight actuated member and adapted to release one of said latches at the termination of the return movement of the weight actuated member.

4. In a weighing scale the combination of a weight actuated member, an indicator cooperating therewith and provided with a toothed wheel, a latch adapted to engage the teeth of said wheel and lock the latter against movement in both directions, means for releasing said latch means for holding the latch out of engagement with the teeth during the weighing operation and adapted upon relaxation of weight on the weight actuated member to permit engagement of the latch with the teeth of said wheel, and a slidable part operable with the weight actuated member and engaging the latch at the termination of the return movement of said weight actuated member to disengage the latch from the teeth.

5. In a weighing scale, the combination of a dial, a rotatable indicator cooperating therewith and a weight actuated member for controlling the movement of the indicator, both being independently operable, a latch adapted to normally hold the indicator in the zero position, means for releasing said latch, said latch also being adapted at the conclusion of each weighing operation to interlock with the indicator and hold same against movement in both directions, a second latch to hold the indicator from moving forward, and means operable with the weight actuated member for engaging the first latch at the termination of the return movement of the weight actuated member to release the first latch from the indicator.

6. In a weighing scale, the combination of weighing mechanism, indicating mechanism having the extent of its movement determined by the position of the weighing mechanism, a latch for the indicating mechanism, coin controlled means for releasing said latch, a trip member for engaging said coin controlled means to hold the latch out of engagement with the indicating mechanism during the weighing operation and having a pawl thereon, a vertically slidable rack bar cooperating with said pawl to release the trip member from said coin controlled means to permit said latch to interengage with the indicating mechanism upon change of position of the weighing mechanism, and a second coin controlled latch for the indicating mechanism held in released position by said trip member engaging said coin controlled means to permit operation of the indicating mechanism, and when disengaged by the release of the weight to be determined to hold said indicating mechanism against forward movement to register a greater or additional weight.

7. In a weighing scale, the combination of a weight actuated member, a coin controlled indicator, means for limiting the number of weight indications for each coin comprising mechanism including a latch and a slidable toothed bar and a pivoted plate having a pawl cooperating with the bar and controlled by vibration of the weight actuated member for locking the indicator at substantially the determined weight until the weight actuated member returns to the normal position and being released by movement thereof, and an additional latch to hold the indicator against forward movement, said last latch being inoperative during the weight indicating operation after insertion of a coin.

8. A coin-controlled weighing scale comprising weighing mechanism having a platform, indicating mechanism having the extent of its initial movement determined by the position of said weighing mechanism, a coin-controlled lever for locking said mechanism, means for holding said coin controlled locking means in released position and actuated by the movement of said weighing mechanism when the weight has been removed from the scale platform or reduced subsequent to the completion of the initial movement of said indicating means for permitting said coin-controlled lever to lock said indicating means against further movement in either direction, said weighing mechanism including a part adapted to be shifted with a sliding movement to release said coin-controlled lever at the termination of the weighing operation.

9. In a weighing scale, a counterbalanced, weight-actuated member adapted to be shifted to different positions in accordance with the load thereon, a shiftable indicator adapted to be arrested by said member in different weight indicating positions, a toothed part connected to and shiftable with said indicator, a coin controlled catch cooperating with said toothed part, a dog for holding said catch disengaged during the weight indicating operation, a trip for said dog adapted to be operated by said weight-actuated member when the weight has been removed from the scale platform or reduced to effect the engagement of said catch with said toothed part in any of the different positions of said indicator, said catch and toothed part, when engaged, serving to prevent reverse movement and a second weight indicating operation, and a second catch for the indicator to permit operation thereof when disengaged, and to hold the indicator against forward movement but permit backward movement thereof when engaged with said indicator.

10. In a weighing scale, the combination of a weight actuated member, a rotary member cooperating therewith and provided with an indicator for indicating the weight on said weight actuated member, a latch for locking said rotary member, means for releasing said latch from the rotary member during the weighing operation, means including said releasing means for holding said latch in released position and adapted to permit said latch to interlock with said rotary member upon relaxation of weight on the weight actuated member or vibration thereof so as to hold the indicator substantially in the determined weight indicating position, and a plate movable with the weight actuated member and adapted to release the latch at the termination of the return movement of the weight actuated member.

JOHN B. WATLING.